US008654460B2

(12) United States Patent
Matsui

(10) Patent No.: US 8,654,460 B2
(45) Date of Patent: Feb. 18, 2014

(54) LENS BARREL

(75) Inventor: Kazuaki Matsui, Hyogo (JP)

(73) Assignee: Panasonic Corporation, Osaka (JP)

( * ) Notice: Subject to any disclaimer, the term of this patent is extended or adjusted under 35 U.S.C. 154(b) by 124 days.

(21) Appl. No.: 13/355,574

(22) Filed: Jan. 23, 2012

(65) Prior Publication Data

US 2012/0188658 A1    Jul. 26, 2012

(30) Foreign Application Priority Data

Jan. 24, 2011  (JP) .................................. 2011-011671
Jan. 20, 2012  (JP) .................................. 2012-009618

(51) Int. Cl.
*G02B 7/02*        (2006.01)
(52) U.S. Cl.
USPC ............................. 359/818; 359/819; 359/820
(58) Field of Classification Search
USPC ................................................. 359/818–820
See application file for complete search history.

(56) References Cited

U.S. PATENT DOCUMENTS 7,308,195 B2 *  12/2007  Yumiki et al. ................. 396/75

FOREIGN PATENT DOCUMENTS

| JP | 2003-255452 A | 9/2003 |
| JP | 2004-126029 A | 4/2004 |
| JP | 2006-235020 A | 9/2006 |
| JP | 2008-147734 A | 6/2008 |

* cited by examiner

*Primary Examiner* — James Jones
(74) *Attorney, Agent, or Firm* — Shinjyu Global IP

(57) ABSTRACT

A lens barrel comprises an optical system forming an optical image of a subject, a tube supporting at least one lens included in the optical system, a fixed member disposed on an outer peripheral side of the tube, the fixed member including a wall formed along an outer peripheral face of the tube, an electrical part disposed on an inner peripheral side of the tube, and a flexible printed cable electrically connected to the electrical part. The tube is incorporated into the fixed member by being moved in a specific direction. The wall includes a slit with an inclination of 45 degrees or less with respect to the specific direction, the slit is open at one end in the specific direction. The flexible printed cable is guided to an inner face of the wall and pulled out through the slit to outside of the fixed member.

5 Claims, 14 Drawing Sheets

LENS BARREL

CROSS-REFERENCE TO RELATED APPLICATIONS

This application claims priority to Japanese Patent Application No. 2011-011671 filed on Jan. 24, 2011 and Japanese Patent Application No. 2012-009618 filed on Jan. 20, 2012. The entire disclosure of Japanese Patent Application No. 2011-011671 and Japanese Patent Application No. 2012-009618 is hereby incorporated herein by reference.

BACKGROUND

1. Technical Field

The technology disclosed herein relates to a lens barrel that supports an optical system. In particular, the technology disclosed herein relates to the layout of a flexible printed cable connected to an electrical part.

2. Description of the Related Art

In the past, lens barrels have been used in digital still cameras, camcorders, and other such cameras. With the lens barrel disclosed in Japanese Laid-Open Patent Application 2004-126029, a shutter unit is held in the interior. A flexible printed cable is connected to the shutter unit. The flexible printed cable is connected to an electrical substrate. The electrical substrate is attached to a master flange. The connected part between the flexible printed cable and the electrical substrate is located on the rear face of the master flange, that is, the face to which an imaging element is attached.

SUMMARY

When the flexible printed cable that is pulled out from the interior of the lens barrel is pulled out to the outer peripheral side of the lens barrel, this affords greater latitude in the design of the lens barrel. For example, if the flexible printed cable and another member are connected on the outer peripheral side of the lens barrel, the size of the lens barrel in the optical axis direction can be reduced. No such proposal, however, has been made so far.

In view of this, it is an object of the technology disclosed herein to improve the design latitude of a lens barrel.

The lens barrel disclosed herein comprises an optical system forming an optical image of a subject, a tube supporting at least one lens included in the optical system, a fixed member disposed on an outer peripheral side of the tube, the fixed member including a wall formed along an outer peripheral face of the tube, an electrical part disposed on an inner peripheral side of the tube, and a flexible printed cable electrically connected to the electrical part. The tube is incorporated into the fixed member by being moved in a specific direction. The wall includes a slit with an inclination of 45 degrees or less with respect to the specific direction, the slit is open at one end in the specific direction. The flexible printed cable is guided to an inner face of the wall and pulled out through the slit to outside of the fixed member.

With the technology disclosed herein, it is possible to afford greater latitude in designing a lens barrel.

BRIEF DESCRIPTION OF THE DRAWINGS

Referring now to the attached drawings which form a part of this original disclosure.

DETAILED DESCRIPTION OF PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

An embodiment will now be described through reference to drawings. For the sake of description, the subject side of the digital camera 1 will be called the forward or front side, the user side will be called the back or rear face side, the vertically upper side when the digital camera 1 is in its landscape orientation will be called the upper side, and the vertically lower side when the digital camera 1 is in its landscape orientation will be called the lower side, the right side when viewed from the subject side will be called the right side, and the left side when viewed from the subject side will be called the left side. The "landscape orientation" is an orientation in which the lengthwise direction of a CCD 110 is parallel to the horizontal direction, and the short-side direction of the CCD 110 is parallel to the vertical direction.

Configuration of Digital Camera

Figure 1:
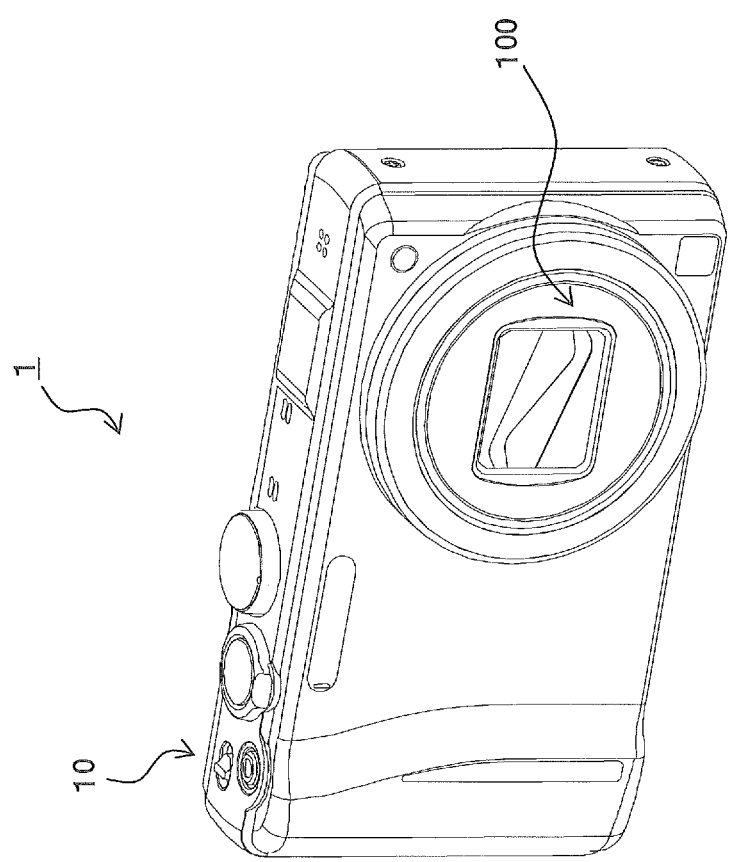
FIG. 1 is an oblique view of a digital camera 1 equipped with a lens barrel 100.

As shown in FIG. 1, a digital camera 1 comprises a lens barrel 100. When a power switch 10 is used to turn on the power to the digital camera 1, the lens barrel 100 is pulled ahead and imaging becomes possible.

The digital camera 1 is shown in FIG. 1, but this is just one example of an imaging device. Instead of a digital camera, this may be a film camera, or it may be a camera with which the lens barrel 100 can be removed and replaced. Furthermore, it need not be a still camera, and may instead be a camcorder capable of capturing moving pictures.

Overall Configuration of Lens Barrel

Figure 2:
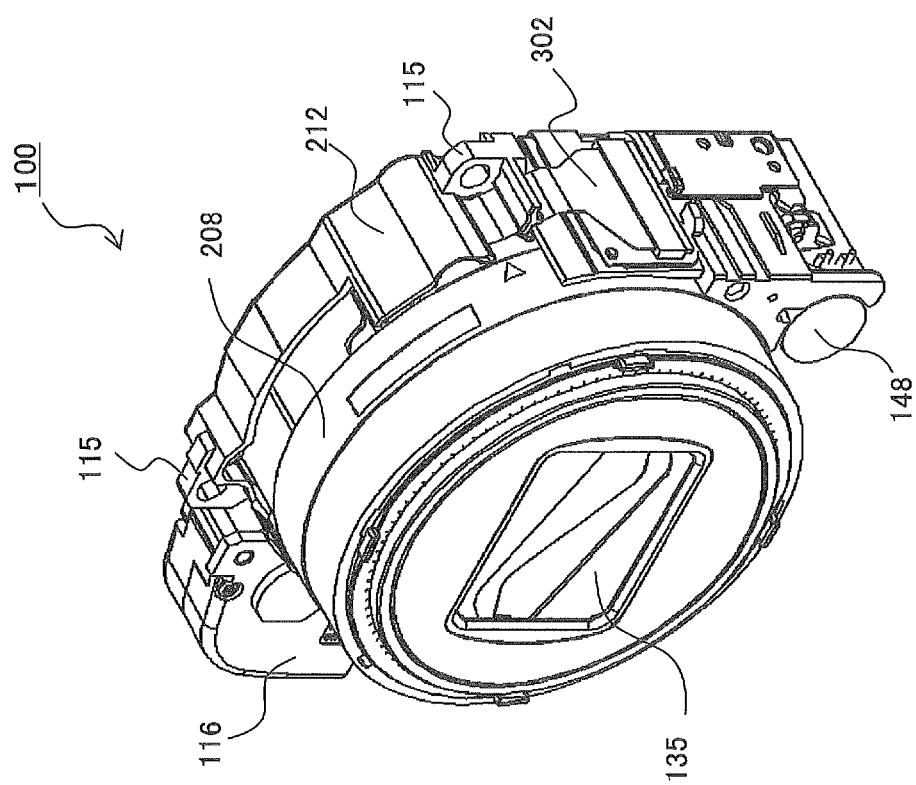
FIG. 2 is an oblique view of when the lens barrel 100 has been retracted.
Figure 3:
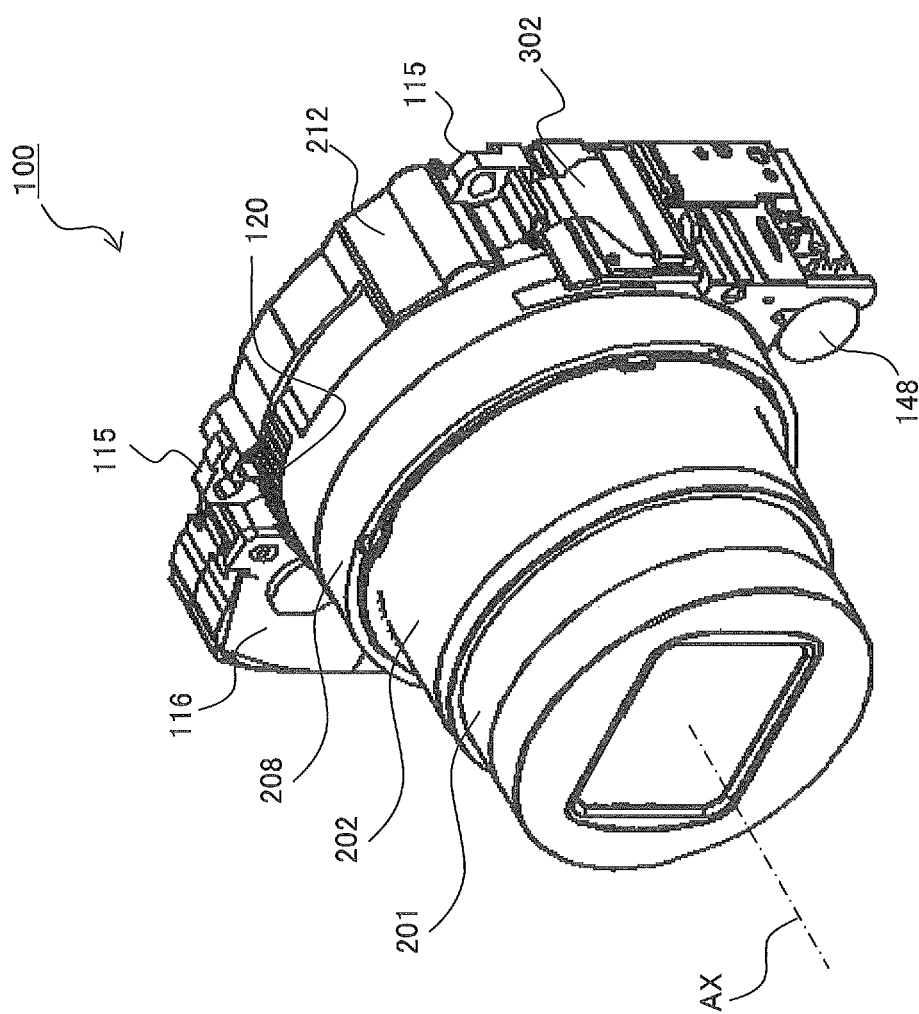
FIG. 3 is an oblique view during imaging with the lens barrel 100.

As shown in FIG. 2, the lens barrel 100 enters its retracted state when the power is switched off to the digital camera 1. In this refracted state, a plurality of frames of the lens barrel 100 is pulled back in, which reduces the size in an optical axis AX direction (see FIG. 4). As shown in FIG. 3, when the power to the digital camera 1 is on, the lens barrel 100 is in a state that allows imaging. In this imaging enabled state, the plurality of frames of the lens barrel 100 are pulled ahead, and the size increases in the optical axis AX direction. FIG. 3 shows the state when an optical system O is at the wide angle end.

As shown in FIGS. 4 to 7, the lens barrel 100 comprises the optical system O (see FIG. 6) and a lens drive mechanism 111. A CCD 110 is further fixed to the lens barrel 100.

The optical system O forms an optical image of a subject on the light receiving face of the CCD 110. The optical system O has a first lens group G1, a second lens group G2, a third lens group G3, a fourth lens group G4, and a fifth lens group G5. The first lens group G1 is composed of a first lens L1, a second lens L2, and a third lens L3. The second lens group G2 is composed of a fourth lens L4, a fifth lens L5, and a sixth lens L6. The third lens group G3 is composed of a seventh lens L7, an eighth lens L8, a ninth lens L9, and a tenth lens L10. The fourth lens group G4 is composed of an eleventh lens L11. The fifth lens group G5 is composed of a twelfth lens L12. The lens barrel 100 moves the first lens group G1, the second lens group G2, and the third lens group G3 in the optical axis AX direction, and varies the spacing between the first lens group G1 and the second lens group G2, as well as the spacing between the second lens group G2 and the third lens group G3, to vary the focal distance of the optical system O. Varying the focal distance is also called zooming. In zooming, the fifth lens group G5 does not move in the optical axis AX direction. Also, the lens barrel 100 moves the fourth lens group G4 in the optical axis AX direction and varies the focal state of the optical system O. Changing the focal state is also called focusing. The makeup of the various lenses of the optical system O, such as their number and shape, need not be as described above.

The CCD 110 is subjected to light of an optical image of a subject, converts this into an electrical image signal, and outputs this signal. The CCD 110 is an example of an imaging element. The imaging element may instead be a CMOS image sensor.

The first lens group G1, the second lens group G2, and the third lens group G3 are driven by the lens drive mechanism 111. The lens drive mechanism will be described in detail below.

Lens Drive Mechanism 111

The lens drive mechanism 111 comprises a first group frame 201, a first group rectilinear frame 202, a cam frame 203, a second and third group rectilinear frame 204, a second group frame 205, a blur correction frame 206, a shutter unit 207, a rotating frame 208, a fixed frame 209, a fourth group frame 210, a fifth group frame 211, and a fixed member 212.

The first group frame 201 holds the first lens group G1. The second group frame 205 holds the second lens group G2. The blur correction frame 206 holds the third lens group G3. The fourth group frame 210 holds the fourth lens group G4. The fifth group frame 211 holds the fifth lens group G5. The first group frame 201, the second group frame 205, the blur correction frame 206, the fourth group frame 210, and the fifth group frame 211 are driven in the optical axis direction with respect to the fixed frame 209.

Fixed Frame 209

Figure 4:
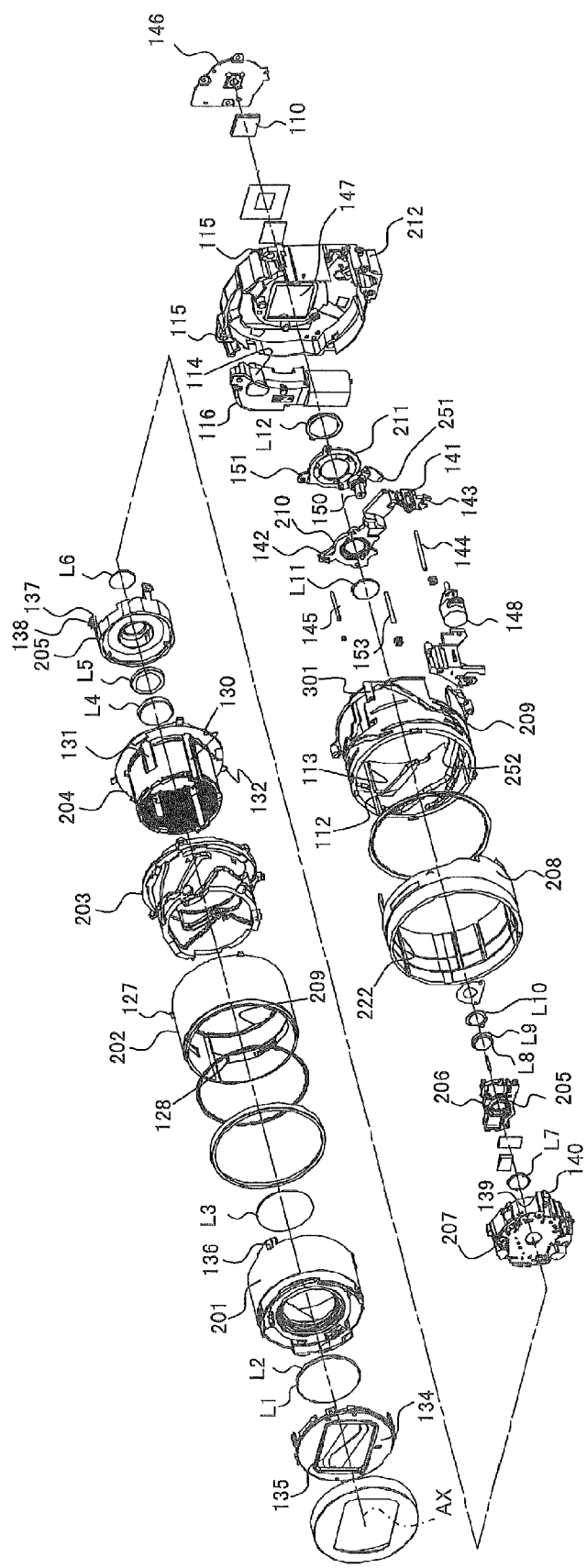
FIG. 4 is an exploded oblique view of the lens barrel 100.
Figure 5:
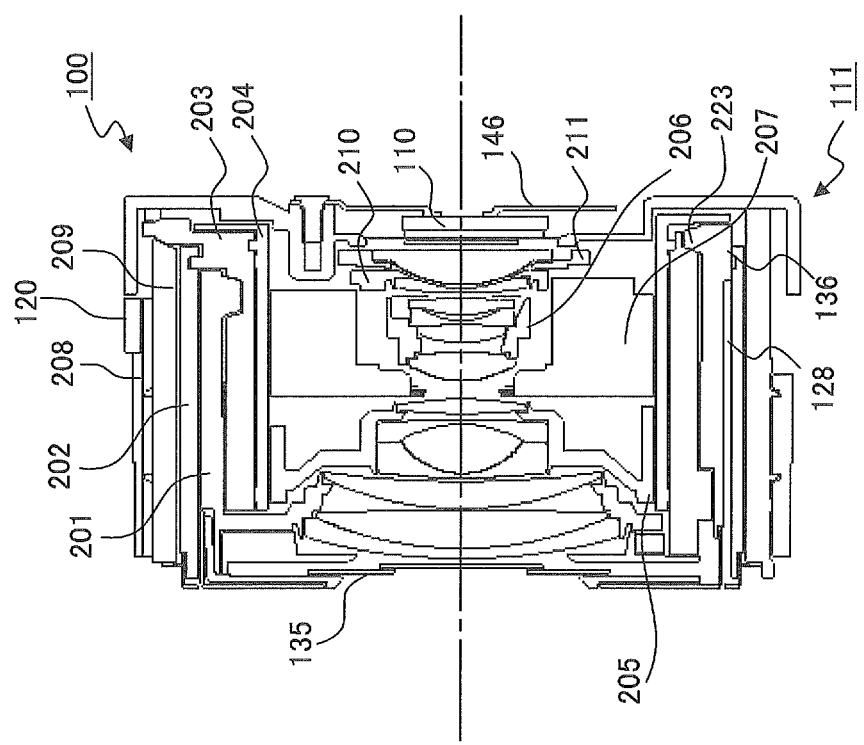
FIG. 5 is a cross section of when the lens barrel 100 is retracted.
Figure 6:
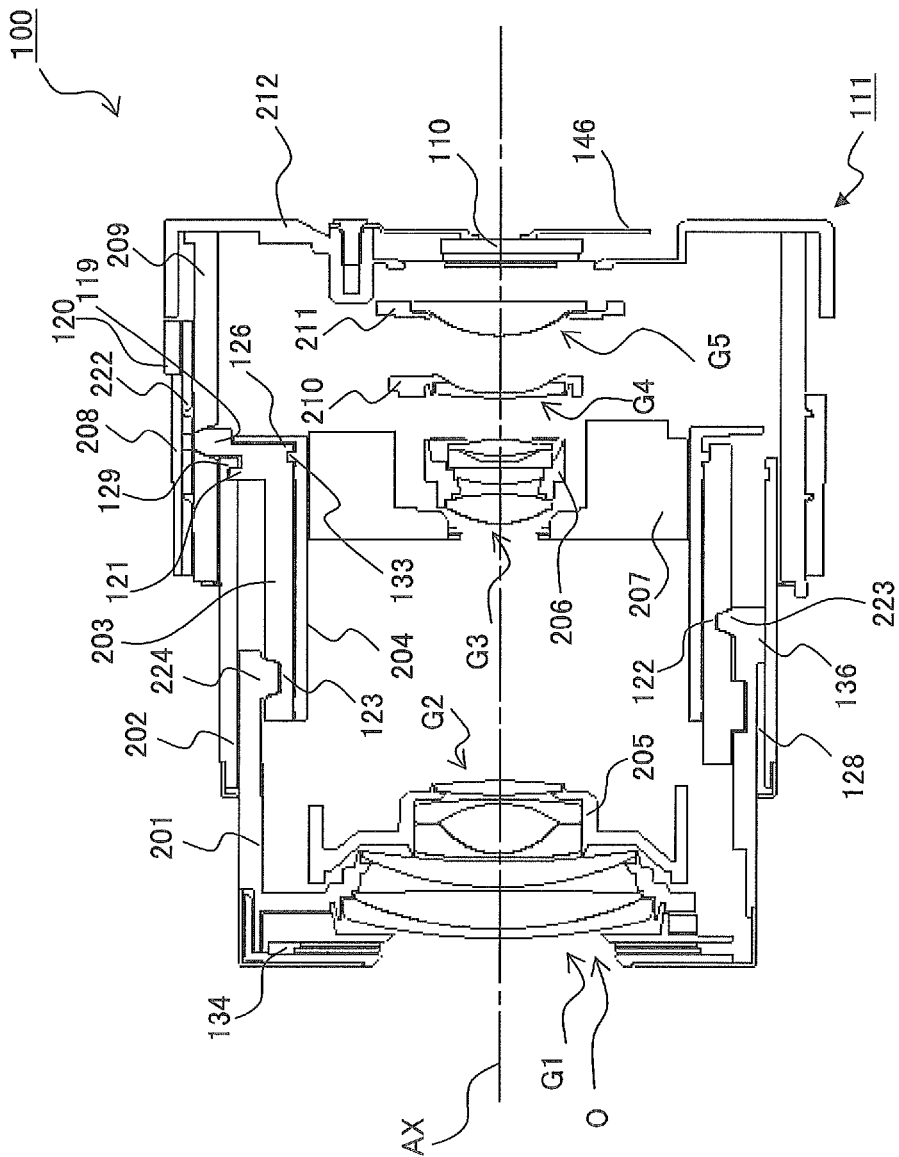
FIG. 6 is a cross section at the wide angle end of the lens barrel 100.
Figure 7:
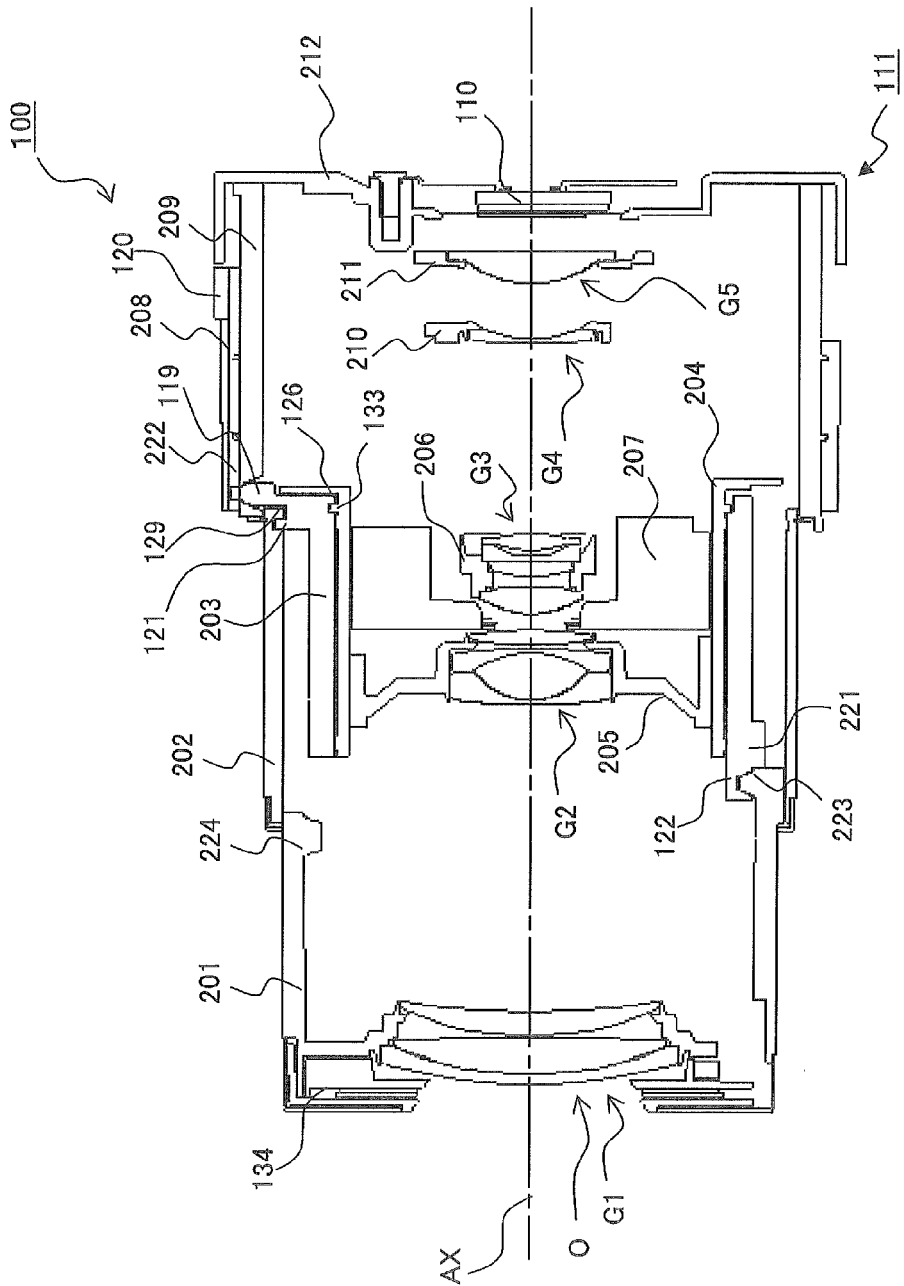
FIG. 7 is a cross section at the telephoto end of the lens barrel 100.

As shown in FIG. 4, three first cam grooves 112 and four first rectilinear guide grooves 113 are formed in the fixed frame 209 (an example of a tube). The first cam grooves 112 pass through from the inside to the outside of the fixed frame 209. The fixed frame 209 supports the cam frame 203 via the first cam grooves 112. Also, the fixed frame 209 supports the first group rectilinear frame 202 via the first rectilinear guide grooves 113.

The fixed member 212 is fixed to the rear of the fixed frame 209. More specifically, screw bosses 301 (an example of a protrusion) are formed on the fixed frame 209. The fixed member 212 is fastened to the fixed frame 209 by the bosses 301 (an example of a protrusion) of the fixed frame 209 and screws (an example of a fastener).

The bosses 301 are disposed on the outside of the tubular portion of the fixed frame 209. Since the bosses 301 are fixed to the tubular portion of the fixed frame 209, they do not move relatively with respect to the fixed frame 209. Holes 307 (not shown in FIG. 4; see FIG. 10) to which screws are attached are formed in the rear face of the bosses 301.

In the step of attaching the fixed frame 209 to the fixed member 212, first the fixed member 212 is moved along the optical axis AX direction (an example of the specific direction), which attaches the fixed member 212 from the subject side of the fixed frame 209, after which the fixed member 212 is fastened to the boss 301 with a screw.

Fixed member 212

The CCD 110 is fixed from behind to the fixed member 212 via a CCD attachment plate 146. The CCD 110 faces the light receiving face to the front, through an opening 147.

Attachment portions 115 that are attached to the main body of the digital camera 1 are formed on the outer peripheral part of the fixed member 212. The attachment portions 115 are formed so as to protrude from the outer face of the fixed member 212. The fixed member 212 is screwed to the housing of the digital camera 1 at the attachment portions 115.

A zoom motor unit 116 is fixed to the fixed member 212. The zoom motor unit 116 has a first drive gear 114 whose rotational axis is parallel to the optical axis. The zoom motor unit 116 rotationally drives the first drive gear 114.

Rotating Frame 208

The rotating frame 208 (an example of a rotating frame) is provided on the outer peripheral side of the fixed frame 209. The rotating frame 208 is able to rotate relatively with respect to the fixed frame 209, around the optical axis AX direction. A gear portion 120 is formed on the outer peripheral part of the rotating frame 208. The gear portion 120 meshes with the first drive gear 114, and is rotated by the first drive gear 114. In other words, the rotating frame 208 is rotationally driven by the zoom motor unit 116 via the gear portion 120 and the first drive gear 114.

Three second rectilinear grooves 222 are formed in the inner peripheral part of the rotating frame 208. The second rectilinear grooves 222 extend in the optical axis AX direction.

Cam Frame 203

Figure 8:
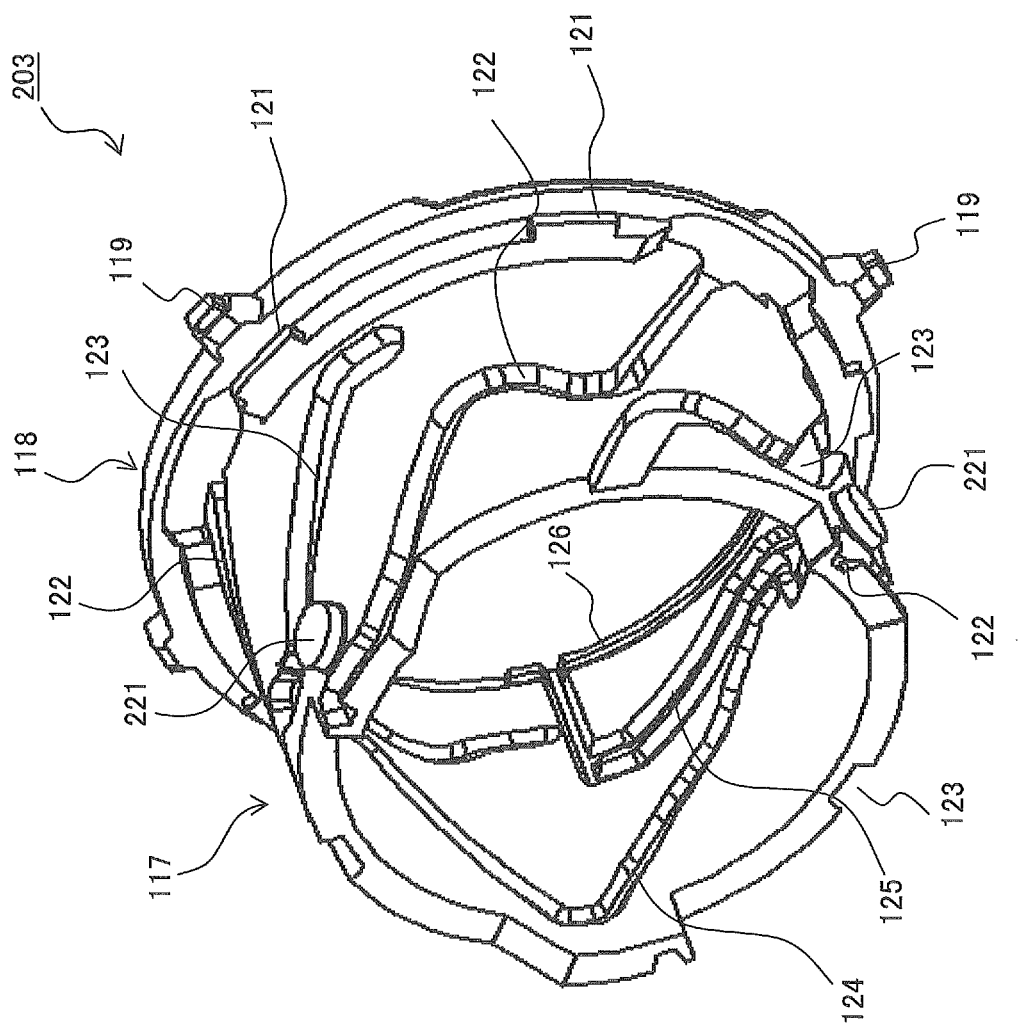
FIG. 8 is an oblique view of a cam frame 203.

As shown in FIG. 8, the cam frame 203 has a tube 117 and a first flange 118 formed on the outer peripheral side of the rear end of the tube 117.

Three first cam pins 119 and first bayonet engagement portions 121 are formed on the outer peripheral part of the first flange 118. As shown in FIGS. 4 to 7, the first cam pins 119 each engage with one of the first cam grooves 112. The cam frame 203 is supported by the fixed frame 209 via the first cam pins 119. The first cam pins 119 go through the first cam grooves 112 and engage with the second rectilinear grooves 222. The cam frame 203 rotates along with the rotating frame 208. In other words, the cam frame 203 is rotationally driven by the zoom motor unit 116 via the rotating frame 208, the gear portion 120, and the first drive gear 114.

Three first auxiliary pins 221 that protrude to the outside, three second cam grooves 122, and three first auxiliary grooves 123 are formed on the outer face of the tube 117. Three third cam grooves 124, three fourth cam grooves 125, and second bayonet engagement portions 126 are formed on the inner face of the tube 117.

First Group Rectilinear Frame 202

As shown in FIGS. 4 to 7, the first group rectilinear frame 202 has a tubular shape. Four first rectilinear guide protrusions 127 that protrude to the outside are formed on the outer face of the first group rectilinear frame 202. The first rectilinear guide protrusions 127 each engage with one of the first rectilinear guide grooves 113. The first rectilinear guide grooves 113 extend in the optical axis AX direction and guide the first rectilinear guide protrusions 127. The first group rectilinear frame 202 is supported on the fixed frame 209 by the first rectilinear guide protrusions 127 and the first rectilinear guide grooves 113, is able to move in the optical axis AX direction with respect to the fixed frame 209, and its rotation around the optical axis AX with respect to the fixed frame 209 is restricted.

Three third rectilinear guide grooves 128 and third bayonet engagement portions 129 are formed on the inner face of the first group rectilinear frame 202. The third rectilinear guide grooves 128 extend in the optical axis AX direction. The third bayonet engagement portions 129 extend in the circumferential direction. The third bayonet engagement portions 129 engage with the first bayonet engagement portions 121. The engagement between the third bayonet engagement portions 129 and the first bayonet engagement portions 121 restricts movement of the first group rectilinear frame 202 in the optical axis AX direction with respect to the cam frame 203, and allows the cam frame 203 to rotate with respect to the first group rectilinear frame 202.

Second And Third Group Rectilinear Frame 204

As shown in FIGS. 4 to 7, the second and third group rectilinear frame 204 has a tubular shape. Three third rectilinear grooves 130 and three fourth rectilinear grooves 131 are formed in the second and third group rectilinear frame 204. The third rectilinear grooves 130 and the fourth rectilinear grooves 131 extend in the optical axis AX direction. The third rectilinear grooves 130 and the fourth rectilinear grooves 131 pass through from the inside to the outside of the second and third group rectilinear frame 204.

Three second rectilinear guide protrusions 132 that protrude to the outside and fourth bayonet engagement portions 133 that extend in the circumferential direction are formed in the outer periphery of the second and third group rectilinear frame 204. The second rectilinear guide protrusions 132 each engage with one of the first rectilinear guide grooves 113. The engagement between the second rectilinear guide protrusions 132 and the first rectilinear guide grooves 113 results in the second and third group rectilinear frame 204 being supported by the fixed frame 209. The second and third group rectilinear frame 204 is able to move in the optical axis AX direction with respect to the fixed frame 209, and its rotation around the optical axis AX with respect to the fixed frame 209 is restricted. Also, the fourth bayonet engagement portions 133 engage with the second bayonet engagement portions 126. The engagement between the fourth bayonet engagement portions 133 and the second bayonet engagement portions 126 restricts the movement of the second and third group rectilinear frame 204 in the optical axis AX direction with respect to the cam frame 203, and allows the rotation of the cam frame 203 with respect to the second and third group rectilinear frame 204.

First Group Frame 201

As shown in FIGS. 4 to 7, the first group frame 201 supports the first lens group G1. Also, the first group frame 201 supports a barrier unit 134 in front. The barrier unit 134 has a barrier 135 that can be opened and closed. When the lens barrel 100 in its retracted state, the bather 135 is closed and protects the first lens group G1 and blocks light from coming into the optical system O. During imaging, the bather 135 is opened and allows light into the optical system O.

Figure 9:
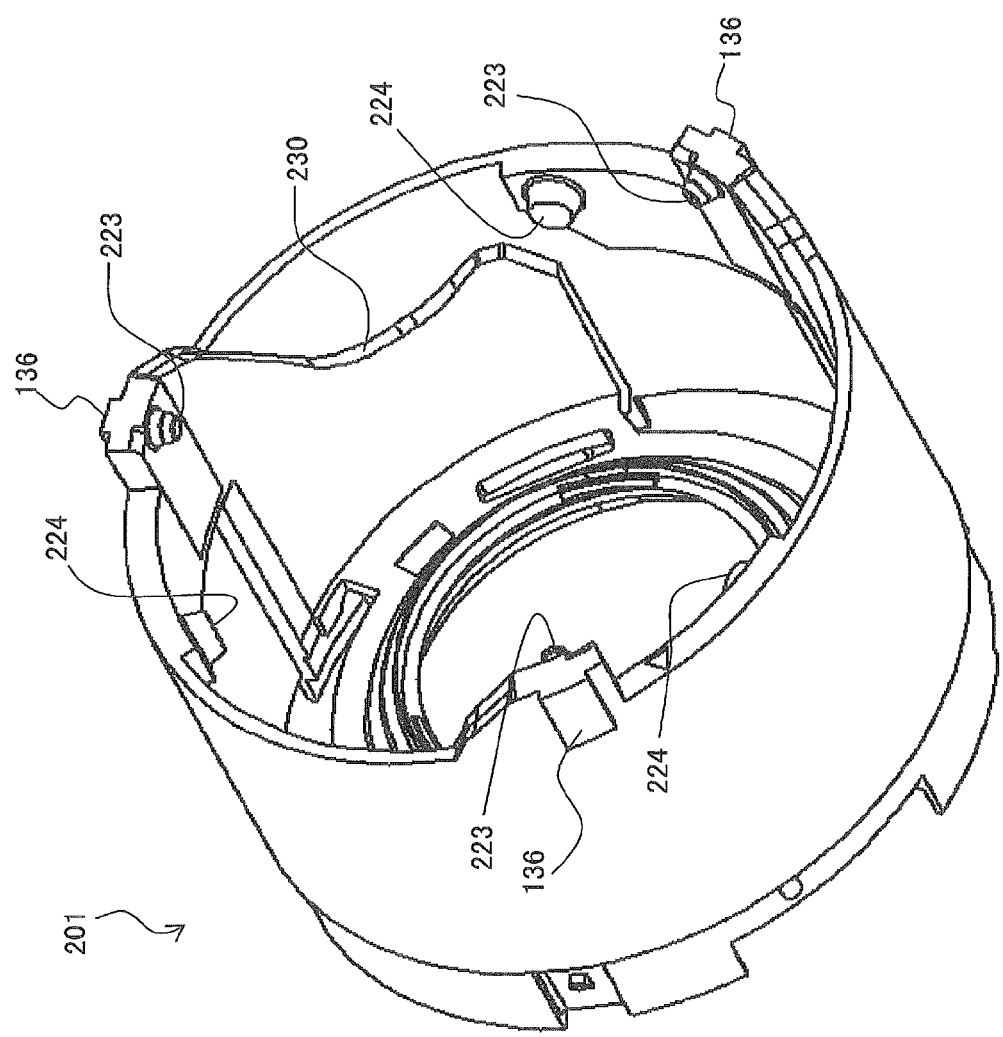
FIG. 9 is an oblique view of a first group frame 201.

As shown in FIG. 9, three third rectilinear guide protrusions 136 that protrude to the outside are formed on the outer peripheral part of the first group frame 201. The third rectilinear guide protrusions 136 each engage with one of the third rectilinear guide grooves 128. The engagement between the third rectilinear guide protrusions 136 and the third rectilinear guide grooves 128 results in the first group frame 201 being supported by the first group rectilinear frame 202, allows it to move in the optical axis AX direction with respect to the first group rectilinear frame 202, and restricts rotation around the optical axis AX with respect to the first group rectilinear frame 202.

Three second cam pins 223 that protrude to the inside and three second auxiliary pins 224 that protrude to the inside are formed on the inner peripheral face of the first group frame 201. The second cam pins 223 each engage with one of the second cam grooves 122. In other words, the second cam grooves 122 are each in contact with one of the second cam pins 223. The engagement between the second cam pins 223 and the second cam grooves 122 results in the first group frame 201 being supported by the cam frame 203. Also, when the second cam pins 223 move along the second cam grooves 122, they cause the first group frame 201 to move in the optical axis AX direction with respect to the cam frame 203.

The second auxiliary pins 224 are each inserted into one of the first auxiliary grooves 123. When the second cam pins 223 move along the second cam grooves 122, the second auxiliary pins 224 also move along the first auxiliary grooves 123. In other words, the first auxiliary grooves 123 are formed along the path of movement of the second auxiliary pins 224 when the first group frame 201 moves in the optical axis AX direction. The second auxiliary pins 224 are formed so that they are at a slight distance from the first auxiliary grooves 123. When an external force is exerted on the first group frame 201 in the optical axis AX direction, the second auxiliary pins 224 come into contact with the first auxiliary grooves 123.

Three walls 230 are formed on the inner peripheral part of the first group frame 201. When the second cam pins 223 move along the second cam grooves 122, the first auxiliary pins 221 also move along the walls 230. In other words, the walls 230 are formed along the path of movement of the first auxiliary pins 221 when the first group frame 201 moves in the optical axis AX direction. More specifically, the walls 230 are formed along the path of movement of the first auxiliary pins 221 on the subject side of the first auxiliary pins 221 in the optical axis AX direction, in a segment of the path of movement of the first auxiliary pins 221. More specifically, this "segment" is the part in which the first auxiliary pins 221 move when the focal distance of the optical system O moves from the wide angle end to the telephoto end.

The walls 230 are formed at a slight distance from the first auxiliary pins 221. When an external force is exerted on the first group frame 201 in the optical axis AX direction, the first auxiliary pins 221 come into contact with the walls 230. In an embodiment, the walls 230 are formed so that the first auxiliary pins 221 and the walls 230 will come into contact when a force is exerted on the first group frame 201 in the direction of retracting the first group frame 201.

The walls 230 may also be formed over the entire movement path. Also, the walls 230 may be formed along the path of movement of the first auxiliary pins 221 on the image side of the first auxiliary pins 221 in the optical axis AX direction in a segment of the path of movement of the first auxiliary pins 221.

Second Group Frame 205

As shown in FIGS. 4 to 7, the second group frame 205 supports the second lens group G2. Three fourth rectilinear guide protrusions 137 that protrude to the outside are formed on the outer peripheral face of the second group frame 205. Three third cam pins 138 are also formed on the second group frame 205. The third cam pins 138 each protrude to the outside from one of the fourth rectilinear guide protrusions 137.

The fourth rectilinear guide protrusions 137 each engage with one of the third rectilinear grooves 130. The engagement between the fourth rectilinear guide protrusions 137 and the third rectilinear grooves 130 results in the second group frame 205 being supported by the second and third group rectilinear frame 204. The second group frame 205 is able to move in the optical axis AX direction with respect to the second and third group rectilinear frame 204, and its rotation around the optical axis AX with respect to the second and third group rectilinear frame 204 is restricted.

The third cam pins 138 engage with the third cam grooves 124. The third cam pins 138 each engage with one of the third cam grooves 124. In other words, the third cam pins 138 each come into contact with one of the third cam grooves 124. The engagement between the third cam pins 138 and the third cam grooves 124 results in the second group frame 205 being supported by the cam frame 203. Also, when the third cam pins 138 move along the third cam grooves 124, they cause the second group frame 205 to move in the optical axis AX direction with respect to the cam frame 203.

Blur Correction Frame 206

As shown in FIGS. 4 to 7, the blur correction frame 206 supports the third lens group G3. The blur correction frame 206 is supported by the shutter unit 207. The blur correction frame 206 is able to move within a plane that is perpendicular to the optical axis AX with respect to the shutter unit 207, and its movement in the optical axis AX direction with respect to the shutter unit 207 is restricted. When the third lens group G3 moves within a plane that is perpendicular to the optical axis AX, it changes the position of the optical image on the light receiving face. The blur correction frame 206 is driven by an actuator 225 (see FIG. 11). For example, the blur correction frame 206 is driven so as to suppress blurring of the optical image caused by shake of the digital camera 1.

Shutter Unit 207

The shutter unit 207 encompasses a shutter (not shown). When the shutter is open, the shutter unit 207 lets light through, but when the shutter is closed, the shutter unit 207 blocks light. The shutter unit 207 can control the transmission and blocking of light in the optical system O. The shutter unit 207 receives a supply of electrical power and drives the shutter open and closed. An actuator is built into the shutter unit 207.

Three fifth rectilinear guide protrusions 139 that protrude to the outside are formed on the outer peripheral face of the shutter unit 207. Three fourth cam pins 140 are also formed on the shutter unit 207. The fourth cam pins 140 each protrude to the outside from one of the fifth rectilinear guide protrusions 139.

The fifth rectilinear guide protrusions 139 each engage with one of the fourth rectilinear grooves 131. The engagement between the fifth rectilinear guide protrusions 139 and the fourth rectilinear grooves 131 results in the shutter unit 207 being supported by the second and third group rectilinear frame 204, allows movement in the optical axis AX direction with respect to the second and third group rectilinear frame 204, and restricts rotation around the optical axis AX with respect to the second and third group rectilinear frame 204.

The fourth cam pins 140 engage with the fourth cam grooves 125. The fourth cam pins 140 each engage with one of the fourth cam grooves 125. In other words, the fourth cam pins 140 each come into contact with one of the fourth cam grooves 125. The engagement between the fourth cam pins 140 and the fourth cam grooves 125 results in the shutter unit 207 being supported by the cam frame 203. When the fourth cam pins 140 move along the fourth cam grooves 125, this causes the shutter unit 207 to move in the optical axis AX direction with respect to the cam frame 203. When the shutter unit 207 moves in the optical axis AX direction, the blur correction frame 206 also moves in the optical axis AX direction along with the shutter unit 207.

Fourth Group Frame 210

As shown in FIGS. 4 to 7, the fourth group frame 210 supports the fourth lens group G4. The fourth group frame 210 has a rectilinear guide portion 141, an anti-rotation portion 142, and a nut engagement portion 143. A first guide pole 144 is inserted into the rectilinear guide portion 141. The first guide pole 144 extends parallel to the optical axis AX. The engagement between the rectilinear guide portion 141 and the first guide pole 144 allows the rectilinear guide portion 141 to move in the optical axis AX direction, and restricts the rectilinear guide portion 141 to move perpendicular to the first guide pole 144. A second guide pole 145 engages with the anti-rotation portion 142. The second guide pole 145 extends parallel to the optical axis AX. The engagement between the anti-rotation portion 142 and the second guide pole 145 restricts rotation of the fourth group frame 210 around the first guide pole 144. A nut of a focus motor unit 148 engages with the nut engagement portion 143. The focus motor unit 148 has a motor, a lead screw that is rotated by the motor, and a nut. The lead screw extends in the optical axis AX direction. The nut engages with the lead screw and is driven in the optical axis AX direction by rotation of the lead screw. That is, the fourth group frame 210 is driven in the optical axis AX direction by the focus motor unit 148.

The first guide pole 144 and the second guide pole 145 are fixed to the fixed member 212. That is, the fixed member 212 supports the fourth group frame 210 via the first guide pole 144 and the second guide pole 145.

Fifth Group Frame 211

As shown in FIGS. 4 to 7, the fifth group frame 211 supports the fifth lens group G5. The fifth group frame 211 has a rectilinear guide portion 150 and an anti-rotation portion 151. A third guide pole 153 is inserted into the rectilinear guide portion 150. The third guide pole 153 extends parallel to the optical axis AX. The engagement between the rectilinear guide portion 150 and the third guide pole 153 allows the rectilinear guide portion 150 to move in the optical axis AX direction, and restricts the rectilinear guide portion 150 to move perpendicular to the third guide pole 153. The second guide pole 145 engages with the anti-rotation portion 151. The second guide pole 145 extends parallel to the optical axis AX. The engagement between the anti-rotation portion 151 and the second guide pole 145 restricts the fifth group frame 211 to rotate around the third guide pole 153.

A spring (not shown) exerts force on the fifth group frame 211 to the subject side. In a state in imaging enabled state, the fifth group frame 211 receives the force of the spring and maintains a state in which a contact portion 251 of the fifth group frame 211 is in contact with a contact portion 252 of the fixed frame 209. In a retracted state, the fifth group frame 211 maintains a state in which it receives the force of the spring and comes into contact with the second and third group rectilinear frame 204. The position of the fifth group frame 211 in a retracted state is closer to the imaging plane side than the position of the fifth group frame 211 in imaging enabled state.

Operation of Lens Barrel

The operation of the lens barrel 100 will now be described. The detailed configuration will also be described at the same time.

The rotating frame 208 is rotated by the zoom motor unit 116 with respect to the fixed frame 209. The engagement between the rotating frame 208 and the first cam pins 119 causes the cam frame 203 to rotate with respect to the fixed frame 209. The first cam pins 119 of the cam frame 203 move along the first cam grooves 112 of the fixed frame 209, and the cam frame 203 moves in the optical axis AX direction with respect to the fixed frame 209. That is, the cam frame 203 is able to rotate and is able to move in the optical axis AX direction. The rotating frame 208 is able to rotate, but does not move in the optical axis AX direction.

The engagement between the third bayonet engagement portions 129 of the first group rectilinear frame 202 and the first bayonet engagement portions 121 of the cam frame 203 causes the first group rectilinear frame 202 to move in the optical axis AX direction integrally with the cam frame 203. At this point, since the first rectilinear guide protrusions 127 of the first group rectilinear frame 202 move along the first rectilinear guide grooves 113 of the fixed frame 209, the first group rectilinear frame 202 does not rotate with respect to the fixed frame 209. That is, the first group rectilinear frame 202 is unable to rotate and is able to move in the optical axis AX direction.

The engagement between the third rectilinear guide protrusions 136 of the first group frame 201 and the third rectilinear guide grooves 128 of the first group rectilinear frame 202 causes the first group frame 201 not to rotate with respect to the first group rectilinear frame 202. That is, the first group frame 201 is unable to rotate. When the cam frame 203 then rotates, the second cam pins 223 of the first group frame 201 moves along the second cam grooves 122 of the cam frame 203. In other words, the first group frame 201 moves in the optical axis AX direction with respect to the first group rectilinear frame 202. That is, the first group frame 201 is able to move in the optical axis AX direction.

The engagement between the fourth bayonet engagement portions 133 of the second and third group rectilinear frame 204 and the second bayonet engagement portions 126 of the cam frame 203 causes the second and third group rectilinear frame 204 to move in the optical axis AX direction integrally with the cam frame 203. At this point, the engagement between the second rectilinear guide protrusions 132 of the second and third group rectilinear frame 204 and the first rectilinear guide grooves 113 of the fixed frame 209 causes the second and third group rectilinear frame 204 not to rotate.

The engagement between the fourth rectilinear guide protrusions 137 of the second group frame 205 and the third rectilinear grooves 130 of the second and third group rectilinear frame 204 causes the second group frame 205 not to rotate. When the cam frame 203 rotates, the third cam pins 138 of the second group frame 205 move along the third cam grooves 124 of the cam frame 203, and the second group frame 205 moves in the optical axis AX direction with respect to the cam frame 203. That is, the second group frame 205 is unable to rotate and is able to move in the optical axis AX direction.

The engagement between the fifth rectilinear guide protrusions 139 of the shutter unit 207 and the fourth rectilinear grooves 131 of the second and third group rectilinear frame 204 causes the shutter unit 207 not to rotate. When the cam frame 203 rotates, the fourth cam pins 140 of the shutter unit 207 move along the fourth cam grooves 125 of the cam frame 203, and the shutter unit 207 moves in the optical axis AX direction with respect to the cam frame 203. The blur correction frame 206 moves in the optical axis AX direction integrally with the shutter unit 207.

The fourth group frame 210 is moved by the focus motor unit 148 in the optical axis AX direction with respect to the fixed member 212.

When the second and third group rectilinear frame 204 moves to its position in the imaging enabled state, the force of the spring causes the fifth group frame 211 to move to the subject side until the contact portion 251 of the fifth group frame 211 hits the contact portion 252 of the fixed frame 209. Also, when the second and third group rectilinear frame 204 moves to its position in a retracted state, the fifth group frame 211 is pushed by the second and third group rectilinear frame 204 and moves to the imaging plane side.

Therefore, when the rotational force of the zoom motor unit 116 is transmitted through the first drive gear 114 to the gear portion 120 of the rotating frame 208, the rotating frame 208 rotates around the optical axis AX, and the cam frame 203 rotates around the optical axis AX or moves forward while rotating. The cam frame 203, the first group rectilinear frame 202, and the second and third group rectilinear frame 204 move integrally in the optical axis AX direction with respect to the fixed frame 209. During this, the first group rectilinear frame 202 and the second and third group rectilinear frame 204 do not rotate. The rotational force of the cam frame 203 moves the first group frame 201, the second group frame 205, and the shutter unit 207 in the optical axis AX direction. During this, the first group frame 201, the second group frame 205, and the shutter unit 207 do not rotate. Furthermore, the fifth group frame 211 moves under spring force to the subject side until it hits the contact portion.

Configuration of Electrical Connection

Figure 10:
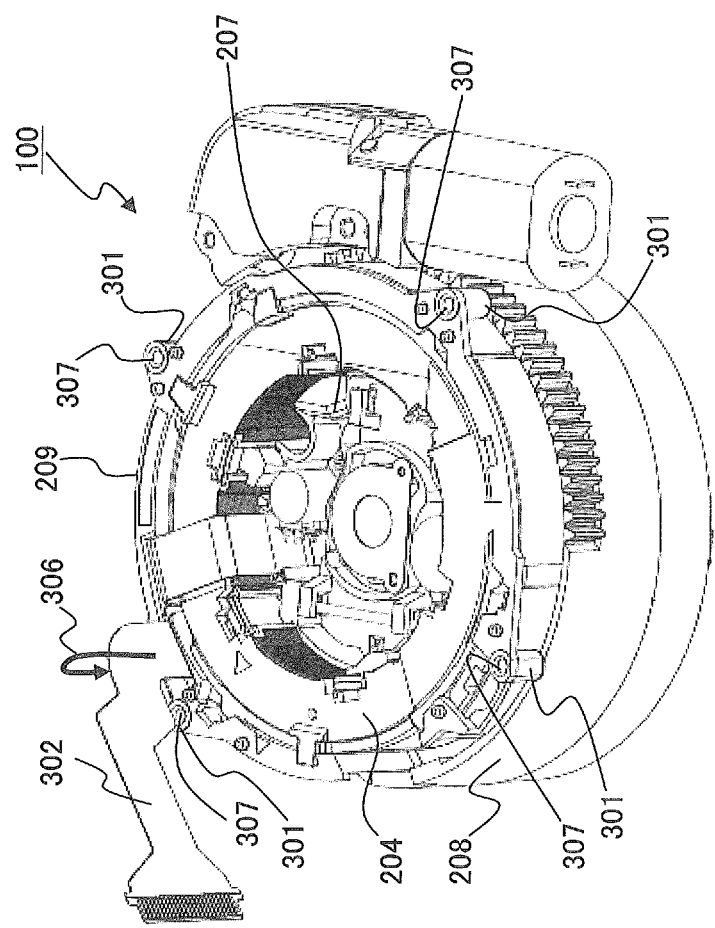
FIG. 10 is a diagram of when a fixed member 212 has been removed from the lens barrel 100 in its retracted state.
Figure 11:
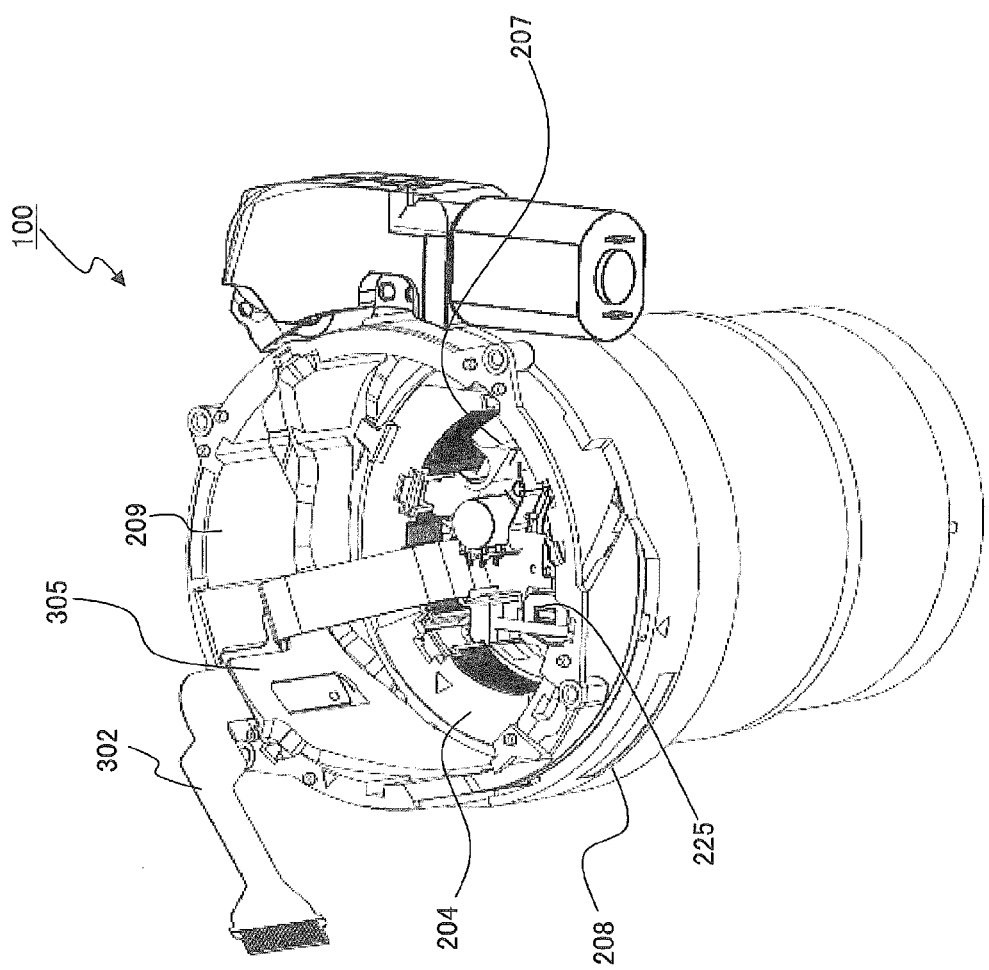
FIG. 11 is a diagram of when the fixed member 212 has been removed from the lens barrel 100 in its wide angle end state.

As shown in FIGS. 10 and 11, a flexible printed cable 302 is electrically connected to the shutter unit 207 and the actuator 225 (examples of electrical parts). The flexible printed cable 302 supplies power to the shutter unit 207 and the actuator 225. The shutter unit 207 and the actuator 225 are examples of electrical parts.

The shutter unit 207 and the actuator 225 are disposed on the inner peripheral side of the fixed frame 209, and move in the optical axis AX direction with respect to the fixed frame 209. The flexible printed cable 302 deforms as the shutter unit 207 and the actuator 225 move.

The flexible printed cable 302 is supported by a support portion 305. The support portion 305 is formed at the rear end of the fixed frame 209. The rear end of the support portion 305 is open toward the optical axis AX direction. The flexible printed cable 302 is inserted into the support portion 305 from the open side of the support portion 305, and supported therein.

When the lens barrel 100 is assembled, the part of the flexible printed cable 302 that extends from the part supported by the support portion 305 is bent from the state shown in FIG. 10 in the direction indicated by the arrow 306. The flexible printed cable 302 is bent at the end portion on the rear side of the fixed frame 209, and extends in the circumferential direction on the outer peripheral side of the rotating frame 208 and the fixed frame 209. The fixed member 212 is attached from the rear of the fixed frame 209. Screws are inserted into the holes 307 formed in the four bosses 301 from the rear of the fixed member 212, which fixes the fixed frame 209 and the fixed member 212. Pins or some other such fasteners may be used instead of screws.

Figure 12:
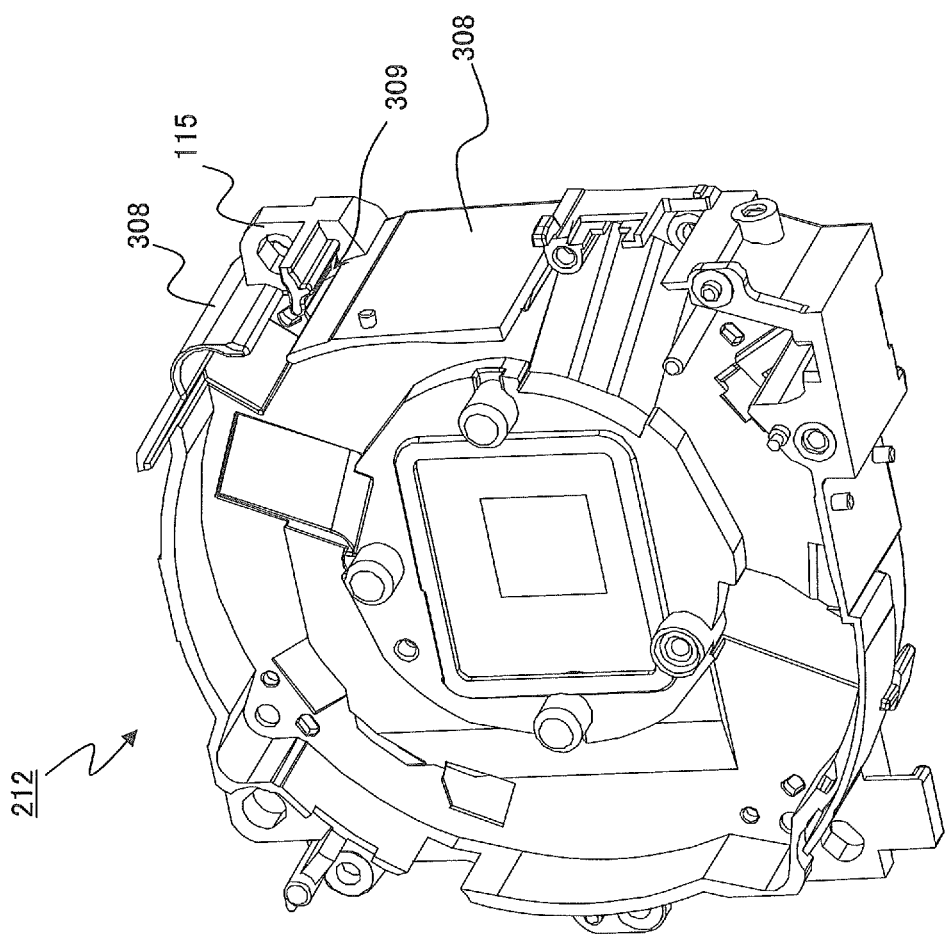
FIG. 12 is an oblique view of the fixed member 212.
Figure 13:
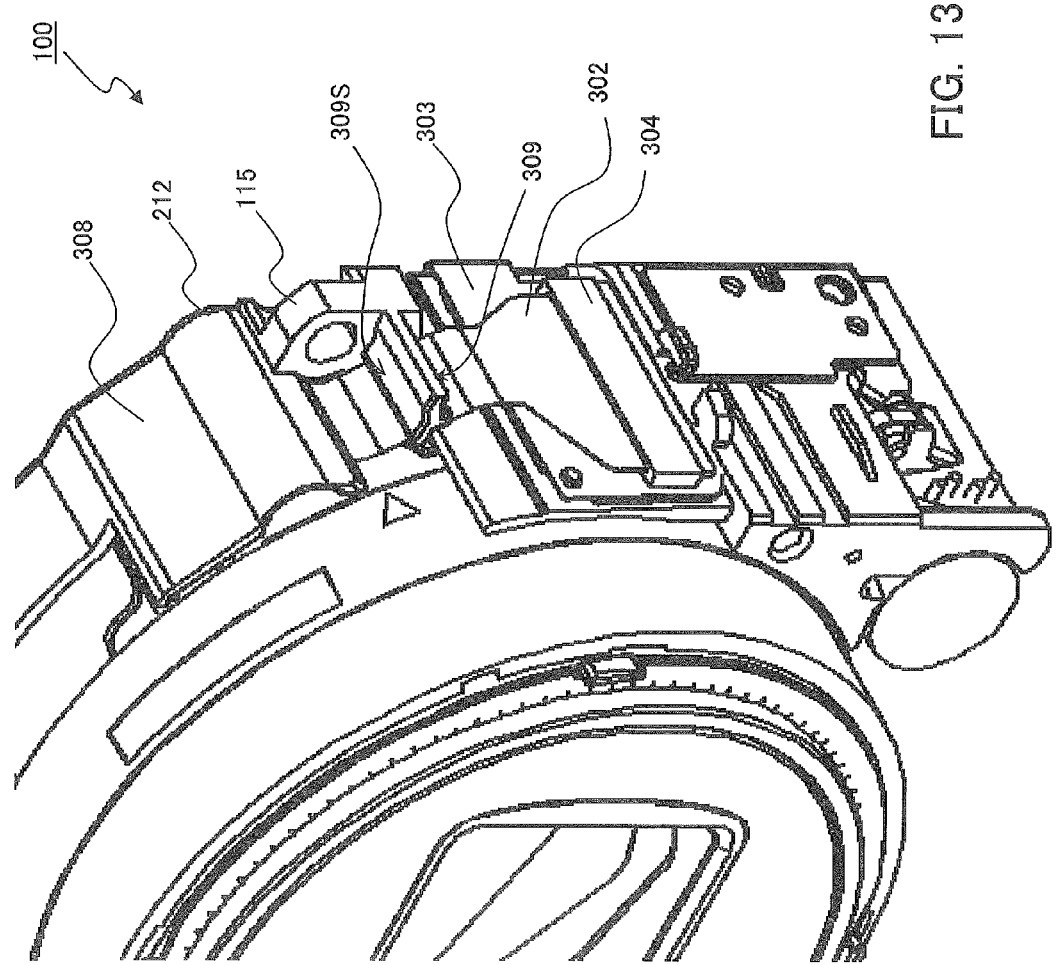
FIG. 13 is a detail oblique view of the connected part of a flexible printed cable 302.
Figure 14:
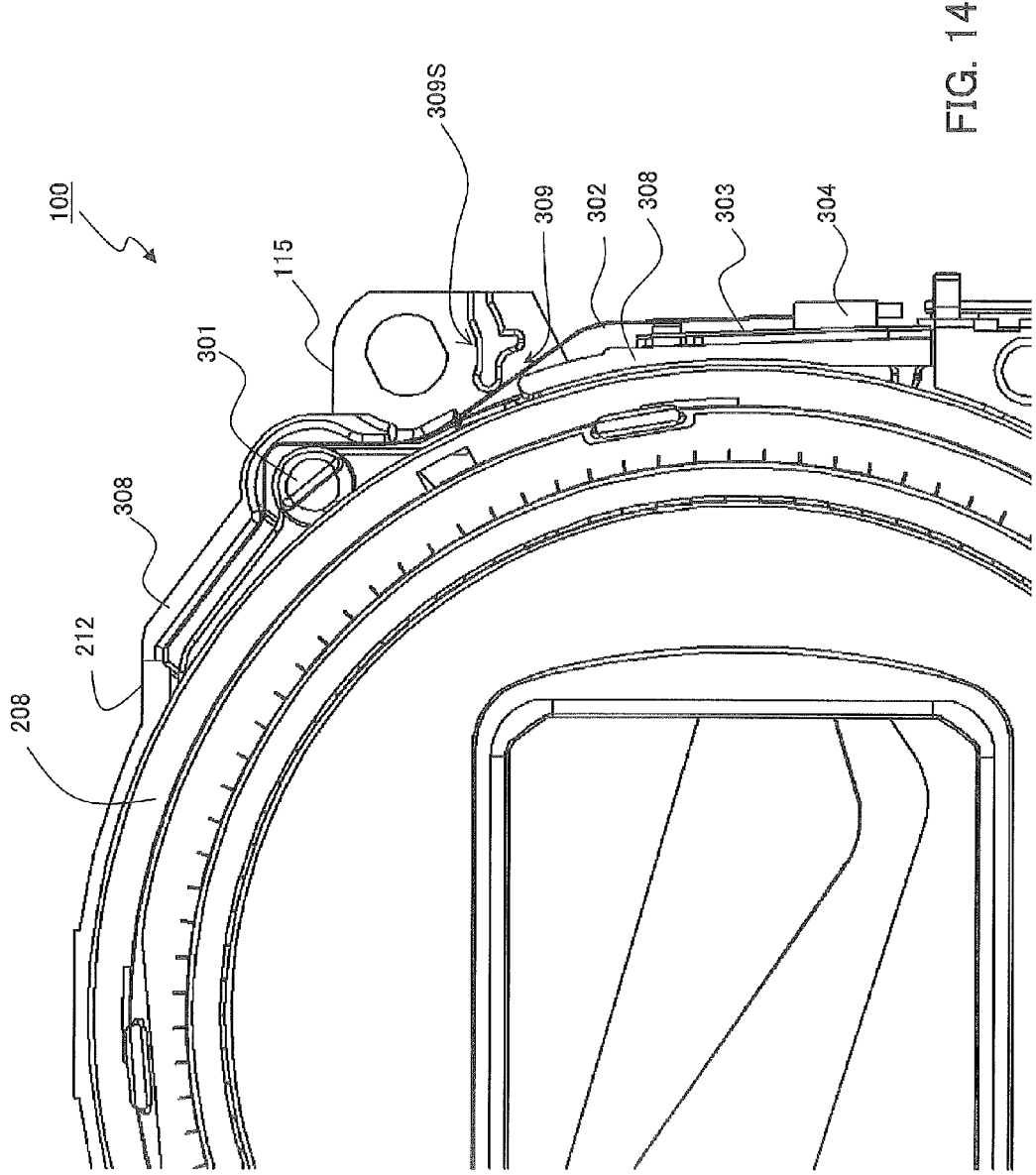
FIG. 14 is a detail front view of the connected part of a flexible printed cable 302.

As shown in FIGS. 12 to 14, walls 308 that protrude to the side where the fixed frame 209 is fixed are formed on the fixed member 212. The walls 308 extend to the outer peripheral side of the fixed frame 209 and are formed along the outer periphery of the fixed frame 209. A slit 309 is formed in the walls 308. The slit 309 is open at the front. Specifically, the end of the slit 309 on the subject side is open. The lengthwise direction of the slit 309 is parallel to the optical axis AX, but may be inclined. For example, the angle between the optical axis AX and the lengthwise direction of the slit 309 is preferably no more than 45 degrees. Specifically, the slit 309 preferably has an inclination of 45 degrees or less with respect to the optical axis AX.

The flexible printed cable 302 is guided along the inner face of the walls 308 and pulled to the outside of the fixed member 212 from the slit 309. The flexible printed cable 302 is connected to another member on the outer peripheral part of the lens barrel 100. More specifically, the flexible printed cable 302 is connected to a flexible printed board 303 that is pulled out on the outer peripheral face of the lens barrel 100 from the rear face of the fixed member 212. The flexible printed cable 302 and the flexible printed board 303 are connected by a connector 304.

When the flexible printed cable 302 is bent from the state shown in FIG. 10 and the fixed member 212 is incorporated into the fixed frame 209, the direction in which the fixed member 212 is incorporated into the fixed frame 209 substantially coincides with the optical axis AX direction. Since the slit 309 is open in the incorporation direction, this makes it an easy job to insert part of the flexible printed cable 302 into the inner face of the walls 308 and pull the flexible printed cable 302 out through the slit 309 to the outside of the fixed member 212.

As shown in FIG. 14, the bosses 301 are disposed on the outside of the rotating frame 208 and on the inside of the walls 308. Since the bosses 301 are fixed to the fixed member 212, they do not move with respect to the fixed member 212. The flexible printed cable 302 is sandwiched between the bosses 301 and the walls 308, and are deformed between the bosses 301 and the walls 308. The flexible printed cable 302 is an elastic member, so it is pressed against the walls 308 by elastic force that attempts to return it to its original shape. The flexible printed cable 302 is held between the bosses 301 and the walls 308. The flexible printed cable 302 is deformed in the slit 309. The flexible printed cable 302 is pressed to the inside of the slit 309 by elastic force that attempts to return it to its original shape. The flexible printed cable 302 is also held by the slit 309.

The bosses 301 are disposed between the rotating frame 208 and the flexible printed cable 302. Specifically, the bosses 301 are disposed on the outside of the rotating frame 208. Accordingly, it is possible to reduce problems such as wear of the flexible printed cable 302 in the rotation of the rotating frame 208, which occurs when the flexible printed cable 302 comes into contact with the rotating frame 208.

As shown in FIG. 14, the direction in which the slit 309 opens from the inner face of the walls 308 toward the outer face is inclined with respect to the radial direction around the optical axis AX. Specifically, the slit 309 is formed so that it extends at an angle to the radial direction when viewed from the optical axis AX direction. Accordingly, the flexible printed cable 302 that is inserted into the slit 309 can conform to the outer peripheral face of the fixed member 212. Therefore, after the flexible printed cable 302 has been pulled to the outside of the fixed member 212, the lens barrel 100 is easier to handle.

Also, the outer face 309S of the slit 309 is provided on the attachment portions 115 of the fixed member 212. Here, part of the outer peripheral face of the fixed member 212 must be made to protrude in order to form the slit 309 extending at an angle to the radial direction. In view of this, the need to separately provide a protrusion for forming the slit 309 can be eliminated by utilizing the attachment portions 115 that protrude on the outer peripheral face of the fixed member 212.

Other Embodiments (A) In the above embodiment, the flexible printed cable 302 was connected to the contact portion 252 and the shutter unit 207 as examples of electrical parts. However, the electrical part is not limited to these. For example, the flexible printed cable 302 may be connected to an aperture drive unit, to an actuator used for focusing, or to an actuator used for zooming, as the electrical part. Also, the flexible printed cable 302 was connected to the actuator 225 and the shutter unit 207, but may be connected to just the actuator 225 or the shutter unit 207.

(B) In the above embodiment, the shutter unit 207 and the actuator 225 were able to move in the optical axis AX direction, but may be constituted so that they do not move.

(C) In the above embodiment, the flexible printed cable 302 was pulled to the outside of the fixed frame 209 through the rear end of the fixed frame 209, but this is not the only option. For example, the configuration may be such that it is pulled out from the side face of the fixed frame 209.

(D) In the above embodiment, the flexible printed cable 302 and the flexible printed board 303 were connected by the connector 304, but any other connection method may be used instead. For instance, the flexible printed cable 302 and the flexible printed board 303 may be connected with a metal having a low melting point, such as solder.

(E) In the above embodiment, the flexible printed cable 302 was connected to the flexible printed board 303, but may be connected to any member.

(F) In the above embodiment, the flexible printed cable 302 was connected to another member at the outer peripheral part of the lens barrel 100, but this is not the only option. For instance, the flexible printed cable 302 may be pulled out past the outer peripheral part of the lens barrel 100 to the rear of the lens barrel 100, and then connected to another member.

(G) The bosses 301 had the holes 307 for inserting screws, but may not have these.

(H) The flexible printed cable 302 is an example of a flexible printed board. This flexible printed board may have just wiring printed, or an electrical part may be mounted.

(I) The fixed frame 209 supports the first lens group G1 via the first group frame 201. Also, the fixed frame 209 supports the second lens group G2 via the first group rectilinear frame 202. Also, the fixed frame 209 supports the third lens group G3 via the shutter unit 207 and the blur correction frame 206. The fixed frame 209 is an example of a member that supports a lens.

(J) One end of the slit 309 on the subject side (that is, the front end) is open, but this is not the only option. One end of the slit 309 on the opposite side from the subject (that is, the rear end) may be open instead. In this case, the fixed frame 209 may be attached to the fixed member 212 from the rear of the fixed member 212, which is formed in a tubular shape.

(K) The fixed frame 209 was incorporated into the fixed member 212 in the optical axis AX direction, but this is not the only option. The direction in which the fixed frame 209 is incorporated into the fixed member 212 can be suitably set according to the shape of the fixed member 212 and the fixed frame 209, and may be a direction that is perpendicular to the optical axis AX.

The above embodiments are basically just preferred examples, and are not intended to limit the present invention, its applications, or the scope of these applications. Also, the above embodiments can be suitably modified, omitted, or combined.

Features of Embodiments

Characteristic portions of the above embodiments will be discussed below. The inventions included in the above embodiments are not limited to what follows, however. What are given in parentheses after the various portions are specific examples of the various portions, and are given for the sake of facilitating an understanding of the features. To obtain the effects discussed for the various features, portions other than the discussed features may be modified or omitted.

(F1)

A lens barrel (100) comprises an optical system (O) for forming an optical image of a subject, a tube (fixed frame 209) for supporting at least one lens included in the optical system, a fixed member (fixed member 212) that is disposed on the outer periphery of the tube and has a wall (wall 308) formed along the outer peripheral face of the tube, an electrical part (shutter unit 207, actuator 225) that is disposed on the inner peripheral side of the tube, and a flexible printed cable (flexible printed cable 302) that is electrically connected to the electrical part. The tube is attached to the fixed member by being moved in a specific direction (the optical axis AX direction). A slit (slit 309) that has an inclination of 45 degrees or less with respect to the specific direction and is open at one end in the specific direction is formed in the wall. The flexible printed cable is guided to the inner face of the wall and pulled out through the slit to the outside of the fixed member.

This affords a greater degree of latitude in designing the lens barrel.

(F2)

The lens barrel (100) comprises a protrusion (301) that is disposed on the outside of the tube (fixed frame 209) and does not move relative to the fixed member (fixed member 212). The flexible printed cable is sandwiched between the inner face of the wall and the protrusion.

Consequently, movement of the flexible printed cable 302 near the protrusion can be suppressed. For example, in an embodiment, in connecting the flexible printed cable 302 to the flexible printed board 303, movement of the flexible printed cable 302 near the bosses 301 is suppressed, which makes the work easier.

(F3)

With the lens barrel (100), a fastener (screw) for fastening the tube (fixed frame 209) and the fixed member (fixed member 212) is attached to the protrusion (boss 301).

Consequently, the action of F2 and the action of fastening the tube (fixed frame 209) and the fixed member (fixed member 212) can be accomplished with the same member, which reduces the number of parts required and simplifies the shape.

(F4)

A connecting member support structure comprises a fixed member (fixed member 212), a rotating tube (rotating frame 208) that can rotate with respect to the fixed member, a first electrical part (shutter unit 207, actuator 225) disposed inside the rotating tube, and a connecting member (flexible printed cable 302) that electrically connects a first circuit board and a second electrical part disposed farther to the outside than the outer peripheral face of the rotating tube. A fixed frame has a slit (309) that holds the connecting member, farther to the outside than the outer peripheral face.

Consequently, it is less likely that the connecting member will wear down through contact with the rotating tube when the rotating tube rotates.

(F5)

A connecting member support structure comprises a fixed member (fixed frame 209), a rotating tube (rotating frame 208) that can rotate with respect to the fixed member, a first electrical part (shutter unit 207, actuator 225) disposed inside the rotating tube, and a connecting member (flexible printed cable 302) that electrically connects a first circuit board and a second electrical part disposed farther to the outside than the outer peripheral face of the rotating tube. The fixed member (fixed frame 209) has a protrusion (boss 301) disposed between the outer peripheral face and the connecting member.

Consequently, it is less likely that the connecting member will wear down through contact with the rotating tube when the rotating tube rotates.

Industrial Applicability

The technology disclosed herein can be utilized as a lens barrel that is used, for example, in a digital camera, a camcorder, a film camera, a portable telephone, a projector or another such device having a projecting optical system, or the like.

What is claimed is:

1. A lens barrel, comprising:
    an optical system forming an optical image of a subject;
    a tube supporting at least one lens included in the optical system;
    a fixed member disposed on an outer peripheral side of the tube, the fixed member including a wall formed along an outer peripheral face of the tube;
    a protrusion disposed on the outer peripheral side of the tube, the protrusion maintaining the relative position to the fixed member;
    an electrical part disposed on an inner peripheral side of the tube; and
    a flexible printed cable electrically connected to the electrical part,
    the tube incorporated into the fixed member by being moved in a specific direction,
    the wall including a slit with an inclination of 45 degrees or less with respect to the specific direction, the slit being open at one end in the specific direction,
    the flexible printed cable guided to an inner face of the wall and pulled out through the slit to outside of the fixed member, and
    the flexible printed cable sandwiched between the inner face of the wall and the protrusion.

2. The lens barrel according to claim 1, wherein the protrusion is attached to a fastener that fastens the tube and the fixed member.

3. The lens barrel according to claim 1, further comprising a rotating frame disposed between the fixed member and the tube, the rotating frame being able to rotate relatively with respect to the tube, wherein
    the protrusion is disposed on an outside of the rotating frame.

4. A lens barrel, comprising:
    an optical system forming an optical image of a subject;
    a tube supporting at least one lens included in the optical system;
    a fixed member disposed on an outer peripheral side of the tube, the fixed member including a wall formed along an outer peripheral face of the tube;
    an electrical part disposed on an inner peripheral side of the tube; and a flexible printed cable electrically connected to the electrical part, the tube incorporated into the fixed member by being moved in a specific direction, the wall including a slit with an inclination of 45 degrees or less with respect to the specific direction, the slit being open at one end in the specific direction, the flexible printed cable guided to an inner face of the wall and pulled out through the slit to outside of the fixed member, and a direction in which the slit opens from the inner face of the wall toward an outer face inclined with respect to a radial direction around an optical axis of the optical system.

5. A lens barrel, comprising:

an optical system forming an optical image of a subject;

a tube supporting at least one lens included in the optical system;

a fixed member disposed on an outer peripheral side of the tube, the fixed member including a wall formed along an outer peripheral face of the tube;

an electrical part disposed on an inner peripheral side of the tube; and a flexible printed cable electrically connected to the electrical part, the tube incorporated into the fixed member by being moved in a specific direction, the wall including a slit with an inclination of 45 degrees or less with respect to the specific direction, the slit being open at one end in the specific direction, the flexible printed cable guided to an inner face of the wall and pulled out through the slit to outside of the fixed member, the fixed member having an attachment portion that sticks out from an outer peripheral face, the attachment portion attached to a housing, and an outer face of the slit provided on the attachment portion.

* * * * *